United States Patent Office 2,846,410
Patented Aug. 5, 1958

2,846,410

THERMO-SETTING COMPOSITIONS OF STYRENE AND CINNAMIC ACID ESTER OF EPOXIDE RESIN

Frank Armitage and Leslie George Trace, Homerton, London, England, assignors, by mesne assignments, to The Sherwin-Williams Company, Cleveland, Ohio, a corporation of Ohio No Drawing. Application August 26, 1954
Serial No. 452,463

Claims priority, application Great Britain
February 9, 1954

3 Claims. (Cl. 260—23)

This invention is for improvements in or relating to thermo-setting compositions, particularly such compositions as would be suitable for use in electrical insulation.

Thermo-setting resins frequently employed in electrical insulation, such as phenolic resins, alkyd resins, urea- and melamine-formaldehyde resins, very often blended with drying oils and/or plasticizers, are characterized by relatively high power factor and relatively high water absorption. Such materials are not suitable for the insulation of high-frequency coils especially if these are to be used in tropical conditions.

Polystyrene is known to have a very low power factor and low water absorption characteristics, but being thermoplastic it is liable to distortion at elevated temperatures and, moreover, is brittle and difficult to plasticize. The introduction of cross-linking agents, such as divinyl benzene, is known to confer thermo-setting properties on the polystyrene. Polymerizable compounds which are derivatives of maleic anhydride, such as diallyl maleate, alkyd resins made from maleic and phthalic anhydrides, including those resins which have been modified with fatty acids and the esterification products of maleic anhydride and castor oil (with or without decarboxylation) have all been used for producing cross-linked co-polymers.

According to the present invention, there is provided a thermo-setting composition comprising an admixture of a cinnamic acid ester or partial ester of an epoxy resin as herein defined and a co-polymerizable monomer.

The term "epoxy resin" as used herein means the reaction product of a polyhydric organic compound and a polyfunctional etherifying agent, particularly of a polyhydric phenol, such as the diphenylol alkanes, and epichlorohydrin or analogous compounds. A preferred class of these compounds are the glyceryl polyethers of dihydric phenols, obtained by reacting a dihydric phenol, such as a diphenylol alkane, in alkaline solution with epichlorohydrin. Although such resins are a complex mixture of compounds, the main product may be represented by the formula:

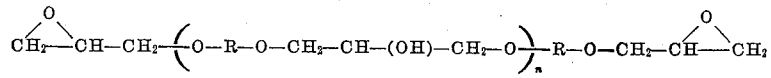

where R represents the divalent hydrocarbon radical of a dihydric phenol.

Exemplary of this class of ether resins is the group of materials having the following general formula:

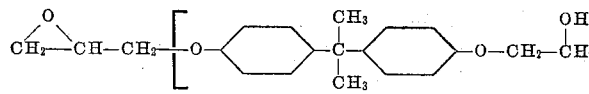

The value of $n$ is at least one. With increasing values of $n$, a range of properties are available permitting selection of desirable properties in the final product.

TABLE I

| Ether Resin | Average value of $n$ | Melting [1] Point, °C. | Color [2] (Gardner), max. | Viscosity [3] (Gardner-Holt) | Epoxide [4] Equivalent Weight |
|---|---|---|---|---|---|
| A | 1 | 20–28 | 10 | $A_2$–$A_1$ | 225–290 |
| B | 2.5 | 64–76 | 8 | C–G | 450–525 |
| C | 5.75 | 97–103 | 6 | R–T | 905–985 |
| D | 11.4 | 127–133 | 8 | Y–$Z_1$ | 1,600–1,900 |
| E | 21.6 | 145–155 | 11 | $Z_2$–$Z_5$ | 2,400–4,000 |

[1] Durran's Mercury method.
[2] 40% Solution in Butyl Carbitol (mono butyl ether of diethylene glycol).
[3] 40% Solution in Butyl Carbitol (mono butyl ether of diethylene glycol).
[4] Epoxide Equivalent Weight: grams of resin containing one equivalent of epoxide.

Reference may be had to U. S. Patent Nos. 2,541,027 and 2,528,932 wherein are provided adequate directions for the preparation of epoxy resins useful herein.

A feature of the invention is that the epoxy resin may be modified with a minor proportion of long chain saturated or unsaturated fatty acids (preferably containing from 12 to 26 carbon atoms in the chain) in addition to the major esterifying cinnamic acid. This may be useful if greater flexibility of the finished cast is required than that obtained by using only cinnamic acid. The practical advantages of the esters of this invention are, generally, a quicker speed of polymerization and the possibility of obtaining harder casts at the same percentage of styrene than with the cinnamic acid esters of unsaturated polyhydric alcohols. The cinnamic acid esters of these epoxy resins are useful as cross-linking agents in the production of thermo-setting products from vinyl compounds, for example, styrene, for use, among other purposes, for electrical insulation. Mixtures of the cinnamic acid esters of epoxy resins may employed and there may, in addition, be present small amounts of other cross-linking agents (i. e. polyfunctional compounds) such as divinyl benzene, maleic anhydride derivatives, allyl esters and cinnamic acid esters of saturated or unsaturated polyhydric alcohols. One advantage of the compositions of the present invention is that they do not require a solvent and all of the constituents of the thermo-setting compositions are, on curing, present in the final product.

It is a feature of the invention that the co-polymerizable monomer is styrene or a nuclear alkyl or nuclear halogen substituted styrene although other co-polymerizable monomeric vinyl compounds may be added. Examples of other monomers are acrylo-nitrile, methyl acrylate, vinyl acetate, acenaphthylene and substituted styrenes generally.

For the purposes of high frequency insulation the preferred monomer to be used is styrene or vinyl toluene, but for alternative uses, other co-polymerizable monomers, such as methyl styrene, methyl methacrylate, vinyl acetate, acrylo-nitrile and acenaphthylene may be used, preferably in admixture with the styrene. Acenaphthylene is a useful addition monomer since its relative non-volatility reduces possible volatilization losses.

Where the epoxy resins are partially esterified with

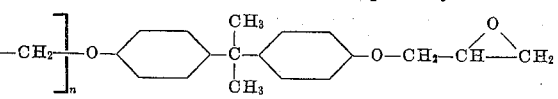

unsaturated fatty oil acids, particularly with conjugated unsaturated fatty oil acids, it is an advantage if the said fatty acids have been co-polymerized with a vinyl compound, such as styrene, before the esterification is carried out since less of the co-polymerizable monomer is required to form a thermo-setting composition than would otherwise be required to produce a final product having the same electrical properties.

Various controlling agents may be incorporated in the composition in order to control the polymerization reaction, a controlling agent such as methyl aniline, for example, when used in amounts of up to 1% by weight of the composition appears to reduce the rate of reaction and may, in certain circumstances, obviate the formation of bubbles in the final cured product, an effect which can also be obtained by the inclusion of cobalt naphthenate in the composition; hydroquinone or similar polymerization inhibitors may be added to give storage-stability to the composition.

In order to facilitate the polymerization reaction, it is advantageous to include a peroxidic polymerization catalyst such as benzoyl peroxide, methyl ethyl ketone peroxide, tertiary butyl hydroperoxide, ditertiary butyl peroxide and tertiary butyl hydroperoxide, ditertiary butyl peroxide and tertiary butyl perbenzoate in the composition and, in some instances, it may be an advantage that the composition is partially polymerized to produce a liquid co-polymer so that the final curing time may be reduced or that the viscosity characteristics are more suitable for a particular application. Such partial pre-polymerization will also reduce shrinkage when poured into the mould and reduce volatilization losses.

The preferred composition comprises 5 to 95% by weight of the co-polymerizable monomer, preferably from 75 to 90%, particularly in the case of styrene, the remainder of the composition being substantially the cinnamic ester.

The presence of acrylo-nitrile in the composition is, in certain circumstances, an advantage since we have found that the presence of acrylo-nitrile increases the speed of the co-polymerization reaction.

The invention also includes a method of preparing an insulated electrical winding by impregnating the winding with a composition in accordance with the present invention and heating the impregnated winding to effect a cure of the composition.

The products obtained by curing the compositions of the present invention provide a hard, tough gel of excellent mechanical and electrical properties. It is possible to use such mixtures for the embedment of electrical coils where the cured resin will be substantially free from fractures, which occasionally mar the properties of compositions which are derivatives of maleic anhydride, and from bubbles which is another source of weakness with some insulating compositions.

The following examples, in which the cobalt naphthenate solution is one containing 4% by weight of cobalt calculated as the metal, will serve to illustrate various methods of carrying the invention into effect.

*Example 1*

150 grams of resin B (Table I) and 150 grams of cinnamic acid were dissolved in 30 grams of xylene containing 1.5 grams of p-toluene sulphonic acid. The reaction mixture was refluxed for 5½ hours at 190–215° C. and the water of esterification was distilled off azeotropically with xylene, through a Dien and Stark separator.

The xylene was finally removed by distillation under vacuum to give a hard brittle resin having an acid value of 36.

35 grams of this ester were dissolved in 15 grams of styrene and 0.5 gram of tertiary butyl hydroperoxide and 0.1 gram of cobalt naphthenate solution were added. This mixture was heated at 195° F. and, after 1½ hours heating, a hard gel was produced.

*Example 2*

200 grams resin B (Table I)
100 grams cinnamic acid
30 grams xylene
0.75 gram p-toluene sulphonic acid The above mixture was refluxed up to 210° C., with a Dien and Stark separator, for 9 hours, by which time the mixture had an acid value of 4.7. The xylene was distilled off and the molten resin poured into a tray.

25 grams of this resin was melted and dissolved in 225 grams of styrene containing 0.25 gram of hydroquinone. In the cold, this solution was somewhat opalescent though quite clear when warmed. 50 grams of this solution with 0.5 gram of tertiary-butyl hydroperoxide and 0.1 gram of cobalt naphthenate solution was heated at 190° F. for 16 hours. A hard, clear cast, free of bubbles and cracks was produced. A corresponding experiment where the tertiary-butyl hydroperoxide was replaced by benzoyl peroxide gave rise to a more rubbery cast.

*Example 3*

192 grams resin C (Table I)
84 grams linseed oil fatty acids
104 grams cinnamic acid
38 grams xylene
0.95 gram p-toluene sulphonic acid An esterification reaction on the above mixture was carried out in a similar manner to that described in Example 2. After 10½ hours reaction an acid value of 19.5 was reached. After distilling off the xylene under vacuum, the ester was dissolved in an equal weight of styrene containing 0.12 gram of hydroquinone.

20 grams of this solution were mixed with 80 grams of styrene and 1 gram of tertiary-butyl hydroperoxide and 0.2 gram of cobalt naphthenate solution added. This was divided into two parts—into one was placed a piece of thick galvanized iron rod. At 190° F. the solution with metal gave a soft gel in 1½ hours and was quite hard after 4½ hours. The solution without the metal required longer for complete cure, but after heating overnight had become equally hard. Both casts were quite clear and substantially free from cracks or bubbles.

Other modes of applying the principle of this invention may be employed instead of those specifically set forth above, changes being made as regards the details herein disclosed, provided the elements set forth in any of the following claims, or the equivalent of such be employed.

We claim:
1. A thermosettable composition comprising an admixture of an ester of an acid selected from the group consisting of cinnamic acid and mixtures of cinnamic acid and at least one long chain fatty acid containing from 12 to 26 carbon atoms in the chain, and a polyglycidyl polyether resin having a 1,2-epoxide equivalent weight of from about 225 to 4,000; and a vinyl monomer selected from the group consisting of styrene, nuclear alkyl substituted styrene, and nuclear halogen-substituted styrene, the amount of said vinyl monomer being from about 5% to about 95% of the combined weight of said monomer and said ester.

2. A composition in accordance with claim 1 which is additionally characterized by the presence therein of up to 1% by weight of the composition of cobalt naphthenate to obviate the formation of bubbles in the thermoset product.

3. A composition in accordance with claim 1 in which the vinyl monomer constitutes from 75% to 90% of the combined weight of said monomer and said ester.

References Cited in the file of this patent
UNITED STATES PATENTS

| | | |
|---|---|---|
| 2,318,959 | Muskat et al. | May 11, 1943 |
| 2,320,536 | Pollack | June 1, 1943 |
| 2,575,440 | Bradley | Nov. 20, 1951 |
| 2,660,563 | Banes et al. | Nov. 24, 1953 |